UNITED STATES PATENT OFFICE.

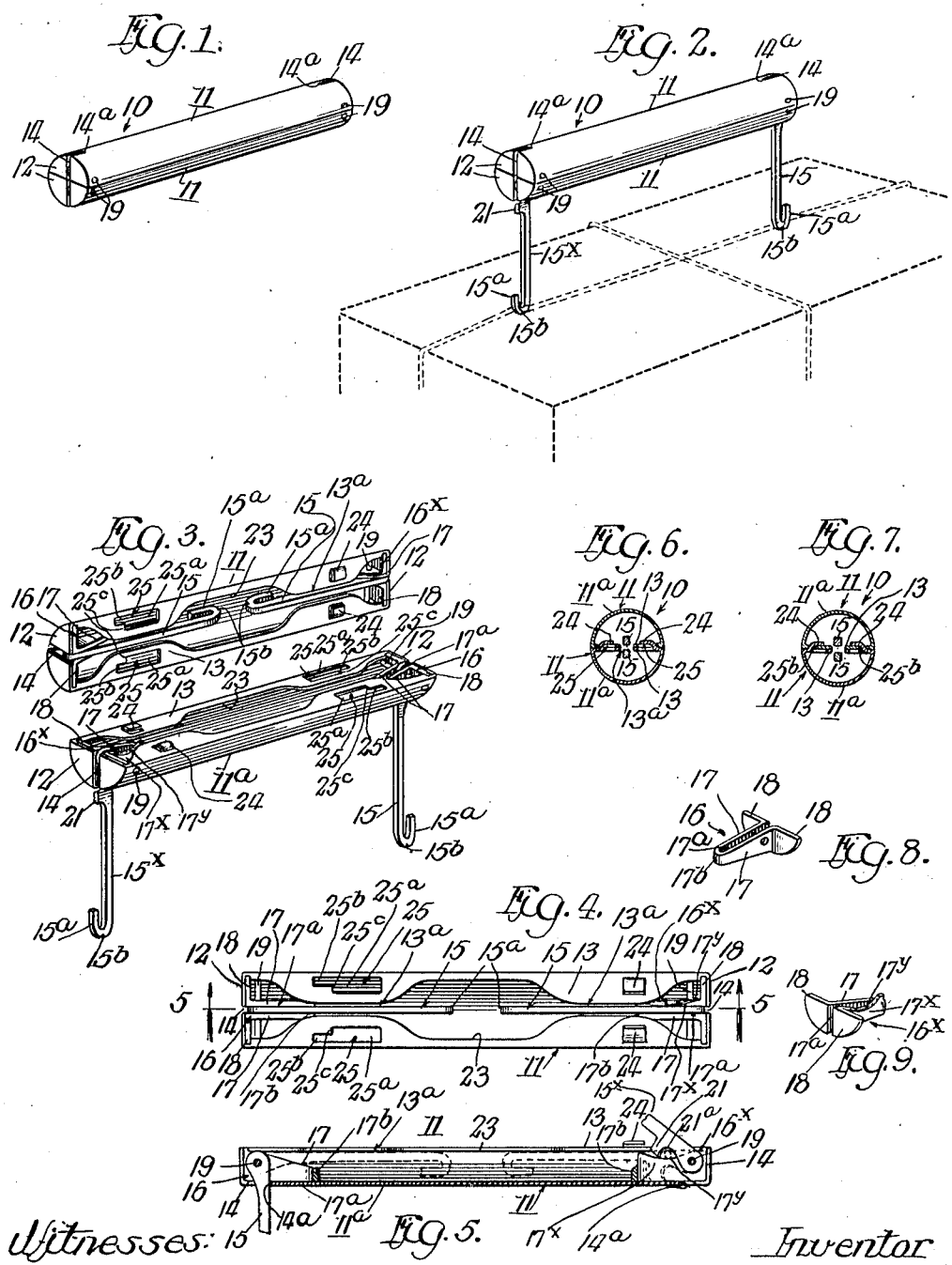

THOMAS E. SOMERVILLE, OF GLENELLYN, ILLINOIS.

BUNDLE-CARRIER.

1,020,722.   Specification of Letters Patent.   Patented Mar. 19, 1912.

Application filed May 8, 1911. Serial No. 625,685.

*To all whom it may concern:*

Be it known that I, THOMAS E. SOMERVILLE, a citizen of the United States, and a resident of Glenellyn, in the county of Dupage and State of Illinois, have invented certain new and useful Improvements in Bundle-Carriers; and I do hereby declare that the following is a full, clear, and exact description thereof, reference being had to the accompanying drawings, and to the letters of reference marked thereon, which form a part of this specification.

This invention relates to an improvement in package and bundle carriers and consists of the matters hereinafter described and more particularly pointed out in the appended claims.

My improved bundle carrier, in its preferred form, consists of an elongated rounded handle comprising two half-round, recessed members dividing said handle longitudinally, each of which handle members carries at its ends pivoted arms, each provided with a hook and adapted to be swung on its pivotal connection with said handle member either into a position where it is inclosed by said handle member or into a position in suspended relation below the same. The two half-round handle members are adapted to be locked together with the carrying arms inclosed within the recesses of the respective handle members to which they are connected, in which case the carrier is in compact form for carrying in a pocket or otherwise. The device is so arranged that it may be used as a single carrier, when the arms of one handle member are swung into suspended relation below the same, the other handle member having been first removed to permit this movement of the carrying arms and having been afterward replaced to form with the other handle member a single handle; or the two handle members may be separated, their respective arms swung into suspended relation therewith, and each used as a separate carrier.

In the drawings—Figure 1 is a perspective view of my improved carrier with the carrying arms folded within and inclosed by the handle members. Fig. 2 is a perspective view of my improved carrier with the carrying arms of one handle member in suspended relation below the handle and applied to a bundle or package indicated by dotted lines; Fig. 3 is a perspective view illustrating the two-part construction of my carrier and showing the one handle member with its carrying arms in suspended relation below it and the other handle member with its carrying arms swung into closed position within said handle member; Fig. 4 is a view representing a top plan view of one of the handle members; Fig. 5 is a view representing a longitudinal, central section of the same on the line 5—5 of Fig. 4; Figs. 6 and 7 are views representing cross sections through the two-part handle, showing the locking members which lock the parts of said handle together,—Fig. 6 showing the parts as they appear before said locking members are engaged, and Fig. 7 showing the parts as they appear after said locking members are engaged; Fig. 8 is a perspective view of one of the bearing members in which the carrying arms are journaled. Fig. 9 is a perspective view of a similar bearing member which is in this case provided with a cutting blade.

Referring now in detail to that embodiment of my invention illustrated in the drawings, 10 indicates the handle of the carrier which, in common with the other parts of the device, are preferably made of metal. Said handle comprises two elongated half-round recessed members 11, 11, which divide the same longitudinally and which are identical in construction so that a description of one will suffice for both.

As shown in the drawings, each handle member 11 is in the form of a half-round tube having a tubular wall 11$^a$ having end walls 12, 12 and a sectional top wall 13. The end walls 12, and the ends of the tubular wall 11$^a$ are cut away so as to provide slots 14, 14, and the top sectional wall 13 is provided with a slot 13$^a$, said several mentioned slots being all located in a common plane extending longitudinally of the handle member and dividing the same equally into two parts.

15, 15 indicate carrying arms provided with hooks 15$^a$ at their ends and pivotally connected to the ends of the handle member to swing in the plane of the slots 14 and 13$^a$. Each carrying arm 15 is pivotally supported at the end of its associated handle member by a bearing member 16 secured in the end thereof. Said bearing member preferably consists of laterally spaced longitudinally extending bars 17, 17 (see Fig. 8) connected together at their inner ends and provided at their outer ends with laterally extending flanges or wings 18, 18, which have side and bottom edges curved to bear against the inner surface of the tubular wall 11ª of the handle member and top edges adapted to lie in the plane of the upper edge of the end wall 12 thereof. Said bearing member is placed within the handle member with the bottom edges of the bars 17 resting upon the tubular wall 11ª thereof and the flanges or wings 18 bearing against the end wall 12 of said handle member. When thus placed in the handle member the space 17ª, separating the lateral bars 17 of the bearing member, is located in the plane of the slots 14 and 13ª formed in said handle member. The end of the arm 15 is pivoted between the lateral bars 17, 17, upon a pin 19 which has bearing at its ends in the tubular wall of the handle member and intermediate its ends in the lateral bars 17, 17 of the bearing member. The arm 15 may be swung on the pivot pin 19 about the end of the handle member and down through the slot 13ª in the top sectional wall thereof, into a position within said handle member. The inner end 17ᵇ of the bearing member is cut away so as to permit the arm to come to a position below the sectional top wall 13 of the handle member. The end 14ª of the slot 14 in the tubular wall 11ª of the handle member limits the swing of one arm toward the other arm.

One or more of the bearing members 16 are preferably provided with a cutting edge against which a string or cord is adapted to be cut by means of the carrying arm pivoted thereto, the arm and the said cutting edge together severing the cord or string in the manner of a pair of scissors. 16ˣ indicates a bearing member provided with such cutting edge. (See Figs. 5 and 9.) Said bearing member 16ˣ is in every way like the bearing member above described, except that one of the bars 17, the bar 17ˣ thereof, for example, has a curved knife edge 17ʸ which projects above the adjacent bar 17. The carrying arm 15ˣ pivoted to said bearing member 16ˣ is preferably provided near its pivotal connection to said member with a lug 21 having a curved knife edge 21ª which is adapted to be caught under a string or cord which, upon swinging said arm into a position within its associated handle member, will be carried into a position across the knife edge 17ʸ of the bearing member and will be cut between said knife edges.

The handle members are provided with means for locking them together with all the carrying arms inclosed within the recesses of the respective handle members to which they are attached or with the carrying arms of one member swung into suspended relation below it. Any convenient locking mechanism will suffice for the purpose. As shown in the drawings, said locking means is as follows: At one end of the handle member (see Fig. 3), the top wall 13 thereof is provided with oppositely disposed, laterally extending tongues 24, 24 formed by cutting the metal of said top wall and bending it outwardly away from and then parallel to said top wall. In the other handle member at the same end thereof, there are formed in the top wall section thereof, key-hole slots 25, 25, which each have a part 25ª substantially as wide as the lateral extent of the tongue 24, and a narrower part 25ᵇ formed by an offset 25ᶜ on the inner edge of the slot 25. The opposite ends of the handle members are provided with like tongues and slots, except that the location of the tongues and slots is reversed, the handle member having the tongue at one end, having the slots at the other. To lock the handle members together, they are brought together with their top walls engaged against each other and with the tongues 24 of each member inserted into the wider part 25ª of the slots 25 of the other member. (See Fig. 6.) The one member is then moved longitudinally with respect to the other member, this movement causing the tongues 24 of the one member to engage under the offsets 25ᶜ of the other member, (see Fig. 7) and thus lock the two parts together. The slots and tongues are so arranged relative to the length of the handle members that when this movement has brought the tongues 24 into engagement with the offsets 25ᶜ, the end walls 12 of the two handle members will be in the same plane, the movement being limited by the striking of the tongues against the end walls of the associated slots. To provide room for inserting the finger to pull out the arms 15, the top wall 13 of each handle member is cut away intermediate its ends to form an opening 23. The ends of the arms 15 are preferably provided with notches 15ᵇ adapted for engagement by the finger nail.

The use of my improved carrier will be apparent from the above description. It is light and of such shape as to be easily carried in the pocket or other convenient receptacle and is always ready for use either as a single carrier or as two separate carriers. It is strong and capable of supporting any package that it should be desired to carry by one hand.

While in describing one embodiment of my invention, I have referred to certain details of mechanical construction it is apparent that these may be variously modified, and my invention is not limited thereby except as pointed out in the appended claims.

I claim as my invention:—

1. A bundle carrier comprising an elongated rounded handle consisting of separable, recessed elongated handle members dividing said handle longitudinally into two parts, and carrying arms having hooked ends, there being a pair of carrying arms for each handle member, each carrying arm being pivotally connected at the end of its associated handle member and being adapted to be swung into the recess therein, and means for removably locking said handle members together.

2. A bundle carrier comprising an elongated tubular handle consisting of separable, elongated handle members dividing said handle longitudinally into two parts, each handle member having end walls and a top wall, and the ends of said handle member and its top wall being provided with slots, a pair of carrying arms having hooked ends for each handle member, pivoted to swing at the ends of each handle member in the plane of said slots, slotted bearing members secured in the ends of said handle members to which said carrying arms are pivotally connected, and means for removably locking said handle members together with the top walls in engagement.

3. A bundle carrier comprising an elongated tubular handle consisting of elongated handle members dividing said handle longitudinally into two parts, each handle member having end walls and a top wall, and the ends of said handle member and its top wall being provided with slots, a pair of carrying arms having hooked ends for each handle member, pivoted to swing at the ends of each handle member in the plane of said slots, one of said carrying arms having a projection provided with a knife edge, slotted bearing members secured in the ends of said handle members to which said carrying arms are pivotally connected, one of said bearing members having a cutting edge adapted to coact with the knife edge on said carrying arm, and means for removably locking said handle members together with the top walls in engagement.

4. A bundle carrier comprising an elongated half-round recessed handle member and a pair of carrying arms having hooked ends, said handle member having end walls and a top wall, and the ends of said handle member and its top wall being provided with slots, each of said carrying arms being pivoted to swing at the ends of said handle member in the plane of said slots, slotted bearing members secured in the ends of said handle member to which said carrying arms are pivotally connected, and one of said bearing members having a cutting edge adapted to coact with the carrying arm pivoted thereto for cutting string and the like.

In testimony, that I, claim the foregoing as my invention I affix my signature in the presence of two witnesses, this 4th day of May A. D. 1911.

THOMAS E. SOMERVILLE.

Witnesses:
CLARENCE E. MEHLHOPE,
GEORGE R. WILKINS.

---

Copies of this patent may be obtained for five cents each, by addressing the "Commissioner of Patents, Washington, D. C."